United States Patent
Speier et al.

(10) Patent No.: US 6,403,175 B1
(45) Date of Patent: Jun. 11, 2002

(54) PROCESS FOR PRODUCING SURFACE-SEALED HOLLOW GLASS CONTAINERS HAVING A HIGH USE STRENGTH

(75) Inventors: Peter Speier, Marl; Peter Jenkner, Rheinfelden; Rainer Lomölder, Münster; Gerd Buchmayer, Bad Wurzach; Alois Fickler, Pfaffenhausen; Elmar Stäbler, Bad Wurzach, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/387,721

(22) Filed: Sep. 1, 1999

(30) Foreign Application Priority Data

Sep. 1, 1998 (DE) .......................................... 198 39 682

(51) Int. Cl.⁷ ................................................. B05D 3/02
(52) U.S. Cl. ................... 428/34.4; 427/387; 427/389.7; 427/535; 428/34.4
(58) Field of Search ......................... 428/34.4; 427/535, 427/387, 389.7

(56) References Cited

U.S. PATENT DOCUMENTS

| 3,438,801 A | 4/1969 | Schlientz et al. ............. 117/88 |
| 3,801,361 A | 4/1974 | Kitaj ........................... 117/124 |
| 3,873,352 A | 3/1975 | Kitaj ........................... 427/379 |
| 4,130,677 A | 12/1978 | Huntsberger ................. 427/379 |
| 4,304,802 A | 12/1981 | Mosse et al. ................ 427/386 |
| 4,374,879 A | 2/1983 | Roberts et al. ................ 428/35 |
| 4,985,286 A | 1/1991 | Kurita et al. |
| 5,498,670 A * | 3/1996 | Aoyama et al. ............. 525/217 |
| 5,567,235 A | 10/1996 | Carson et al. ......... 106/287.16 |
| 6,013,333 A * | 1/2000 | Carson et al. .............. 427/535 |

FOREIGN PATENT DOCUMENTS

| EP | 0 146 142 | 6/1985 |
| EP | 0 478 154 | 4/1992 |
| GB | 2 021 124 | 11/1979 |
| WO | WO 95/00259 | 1/1995 |

* cited by examiner

*Primary Examiner*—C. Melissa Koslow
*Assistant Examiner*—Shalie Manlove
(74) *Attorney, Agent, or Firm*—Oblon, Spivak, McClelland, Maier & Neustadt, P.C.

(57) ABSTRACT

A process for producing surface-sealed hollow glass containers, the hollow glass containers are, in the production process in the region of the exit from the annealing lehr which is located downstream of a machine for producing hollow glass containers, coated by means of a water-based cold end coating composition comprising at least the following components:

I. a trialkoxysilane, a dialkoxysilane and/or a tetralkoxysilane or their hydrolysis and/or condensation products and also II. a water-soluble or water-dispersible mixture of a polyol and a crosslinker, wherein the applied layer of the cold end coating composition is subsequently subjected to a crosslinking step. The hollow glass containers produced in this way have an improved strength.

19 Claims, No Drawings

PROCESS FOR PRODUCING SURFACE-SEALED HOLLOW GLASS CONTAINERS HAVING A HIGH USE STRENGTH

BACKGROUND OF THE INVENTION

1. Field of the Invention

The present invention relates to a process for producing surface-sealed hollow glass containers with the aid of a specific cold end coating composition.

2. Discussion of the Background

It is known that, in the production of hollow glass containers, the latter can be subjected to a surface treatment which is performed to cover external damage such as microcracks and minimize further damage. Thus, the hot end coating is applied as a thin layer to the glass surface which is at from 500 to 550° C. immediately after the production machine. These hot end coating materials are, in particular, titanium and tin chlorides which produce a titanium dioxide or tin dioxide layer on the glass surfaces, with the chlorine liberated going into the waste gas. The hot end coating material is applied by vapor deposition or spray atomization.

After hot end coating, the hollow glass containers run through an annealing lehr in which they are slowly cooled to avoid damaging stresses.

At the discharge end of the annealing lehr, the previously hot end coated hollow glass containers are cold end coated either by means of vapor deposition or by spray atomization. This results in the smoothness necessary for further procedures in the glassworks and in bottling operations.

The substances most frequently used for cold end coating are surfactants, fatty acid products, partial fatty acid esters, ester wax emulsions and various polyethylene dispersions.

A coating process in which hot end coating is first carried out and an olefin polymer, a polyurethane, a polystyrene or an acetic acid salt of an alkylamine is subsequently sprayed on as cold end coating material is known from DE-C 12 91 448. However, the bottles coated in this way do not meet all requirements.

Some improvement in the scratch resistance is achieved if the polyethylene dispersion which is sprayed on as cold end coating composition further comprises a silane (U.S. Pat. No. 3,438,801, 3,801,361, 3,873,352, 4,130,677, 4,374,879, EP-A-0 146 142). However, the property level is not sufficient for all applications.

A further development of the prior art was to spray on, as cold end coating, first the solution or dispersion of a silane and subsequently a further component such as a polyethylene dispersion. Here, reference may be made to U.S. Pat. No. 3,438,801, 4,130,677, 4,304,802, 5,567,235 (corresponds to WO-A-95/00259) and to EP-A-0 146 142 and EP-A-0 478 154.

Furthermore, it is known that cold end coating can also be carried out using a polysiloxane (U.S. Pat. No. 4,985,286; DE-A-31 44 457).

EP-A-0 011 519 describes a process in which glass bottles are treated with a silane and with a powdered polyurethane precursor. In addition, GB-A-2 021 124 describes a process for coating glass containers in which a polyaminoacrylate ester, a crosslinker, a wax and a vinylaminosilane are applied.

Although the coating methods described ensure a good basic strength of the glass containers, this strength decreases rapidly in the further production process and in subsequent use of the containers. A cause of this loss in strength is microscopic damage which inevitably occurs during shaping and the subsequent hot end transport of the glass containers and, depending on the degree and position of damage and the stresses on the container, can act as potential fracture origins.

Accordingly, there remains a need for improved coating processes.

SUMMARY OF THE INVENTION

It is an object of the present invention to provide a process for producing surface-sealed hollow glass containers.

It is another object of the present invention to make, during the production process itself, the microscopic damage discussed above no longer harmful.

It is a further object of the present invention to make the hollow articles less sensitive to mechanical action on the surface during subsequent handling, i.e. on the conveyor belt, during packing, during transport and during filling.

Another important aspect is that the hollow articles should have an improved basic strength and an improved long-term use strength compared to the prior art. Thus, in particular, returnable bottles for carbonated beverages should still have a sufficiently high strength and particularly internal pressure resistance even after many returns.

In addition, the hollow glass containers should have improved chemical resistance, in particular to water and detergent solutions.

Furthermore, the dry and wet scratch resistance should be increased and the scratch-through properties should be improved.

Overall, the mechanical properties compared to the prior art should be improved so that the weight of the container can be reduced while maintaining the same strength.

The mechanical properties should, furthermore, be improved in comparison with the known processes so that hot end coating can be omitted while maintaining the same final strength.

Compared to the coating process customarily carried out, improved labeling, even using conventional glues, should be possible.

Furthermore, it should also be possible to color the hollow glass containers by means of the surface seal and this coloration should be scratch- and detergent-resistant in order to achieve a high flexibility in the product line without subsequent problems during glass recycling.

The objects above, and others, may be accomplished with a process for producing surface-sealed hollow glass containers in which, in the production process in the region of the exit from the annealing lehr, which may be located downstream of a machine for producing hollow glass containers, the hollow glass containers are coated by means of a water-based cold end coating composition comprising at least the following components:

(I) a trialkoxysilane, a dialkoxysilane and/or a tetraalkoxysilane or a hydrolysis and/or condensation product thereof, and (II) a water-soluble or water-dispersible mixture of a polyol and a crosslinker, where the applied layer of the cold end coating composition is subsequently subjected to a crosslinking step in the temperature range from 100 to 350° C.

The objects of the invention may also be accomplished with the glass containers produced by the inventive process.

A more complete appreciation of the invention and many of the attendant advantages thereof will be readily obtained as the same becomes better understood by reference to the following detailed description.

DETAILED DESCRIPTION OF THE INVENTION

In a preferred embodiment of the process of the present invention, the water-based cold end coating composition further comprises, in addition to the components I and II, the following component:

(III) a silicon-free component selected from the group consisting of
(a) a wax,
(b) a partial fatty acid ester,
(c) a fatty acid, and
(d) a surfactant.

In another preferred embodiment of the process, the water-based cold end coating composition further comprises, in addition to the components I, II, and optionally III, the following additional component:

(IV) a colorant selected from the group consisting of organic pigments, inorganic pigments and organic dyes.

In addition, the water-based cold end coating composition may comprise conventional auxiliaries such as antifoams, leveling agents, catalysts (e.g. for the crosslinking of the components I and II additive resins or thixotropes.

The invention further provides the hollow glass containers produced using the process of the present invention.

As used herein, the term "hollow glass containers" includes essentially any type of packaging glass, for example bottles, jars for preservatives, ampoules, tablet vials or flacons.

If desired, a hot end coating material known per se may be applied by any known method art to the surfaces of the freshly produced hollow glass containers in the region of entry to the annealing lehr. However, in view of the tremendous increase in the use strength achieved according to the present invention, the hot end coating may also be omitted, which is not only cheaper but also offers an ecological advantage due to a reduction in emissions. Furthermore, dispensing with the hot end coating gives improved production conditions in the production of glass containers as a result of additional free space, for example a lengthening of the machine belt cooling, side cooling, better access, installation opportunities for hot end inspection machines, etc. Therefore, a process excluding this hot end coating is a preferred embodiment of the present invention.

The individual components and particular aspects of the process will be described in more detail below.

As component I, it is possible to use essentially any trialkoxysilane, dialkoxysilane and tetraalkoxysilane. Examples are given below under the formulae I to IV. Of course, mixtures can also be used as well.

Although the additional use of monoalkoxysilanes is possible within certain limits, it is not advisable because of the reduced stability of the resulting solution, i.e. its tendency to form precipitates.

This silane or the silane mixture can be used in aqueous solution (homogeneous or colloidal) or as an emulsion, as long as it is stable. The concentration is determined by the requirements in use and is therefore not particularly limited. It can be, for example, a maximum of 20%, a maximum of 15%, a maximum of 10%, a maximum of 7.5%, a maximum of 5%, a maximum of 3%, a maximum of 2%, a maximum of 1% or a maximum of 0.8%. The minimum content is, for example, 0.05%, 0.1%, 0.2% or 0.3%. All percentages recited herein are by weight, unless stated otherwise.

In a preferred embodiment, these silanes are used as hydrolysis and/or condensation products, particularly preferably as a water-based organopolysiloxane-containing composition prepared from:

(a) Q mol of an alkoxysilane bearing functional groups and having the formula:

$$A\text{—}Si(R^1)_y(OR^*)_{3-y} \qquad I$$

and (b) M mol of alkoxysilanes selected from the group consisting of α) trialkoxysilanes of the formula:

$$R^2\text{—}Si(OR^{**})_3 \qquad II$$

and/or (β) dialkoxysilanes of the formula:

$$R^3R^4Si(OR^{***})_2 \qquad III$$

and/or (γ) tetraalkoxysilane of the formula:

$$Si(OR^{****})_4 \qquad IV$$

where A is a substituent which bears at least one amino, alkylamino, dialkylamino, amido, epoxy, acryloxy, methacryloxy, cyano, isocyanato, ureido, thiocyanato, mercapto, sulfane or halogen group bound to silicon either directly or via an aliphatic or aromatic hydrocarbon radical, $R^1$=methyl, ethyl or A (as defined above), y=0 or 1, $R^*$, $R^{}$, $R^{*}$ and $R^{****}$ are each, independently of one another, an alkyl group having from 1 to 8 carbon atoms or a corresponding alkyl group substituted with an alkyl[(poly)ethylene glycol] radical, $R^2$, $R^3$ and $R^4$ are each, independently of one another, an alkyl, alkenyl, alkynyl, cycloalkyl, cycloalkenyl or aromatic group having in each case a maximum of 18 carbon atoms or such a group which is partially fluorinated or perfluorinated and/or substituted with alkyloxy and/or aryloxy groups, in a molar ratio $0 \leq M/Q \leq 20$.

The alkoxysilane bearing a functional group and having the formula:

$$A\text{—}Si(R^1)_y(OR^*)_{3-y} \qquad I$$

can, for example, be selected from among the following compounds: 3-aminopropyltrimethoxysilane, 3-aminopropyltriethoxysilane, 3-pyrrolidinopropyltrimethoxysilane, N-methyl-3-aminopropyltrimethoxysilane, 3-aminopropylmethyldiethoxysilane, N-aminoethyl-3-aminopropyltrimethoxysilane, N-(benzylaminoethyl)-3-aminopropyltrimethoxysilane, p-anilinotriethoxysilane, 4-aminobutylmethyldiethoxysilane, $(CH_3O)_3Si\text{—}C_3H_6\text{—}NH\text{—}C_2H_4\text{—}NH\text{—}C_2H_4\text{—}NH_2$,

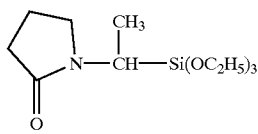

3-glycidyloxypropyltrimethoxysilane

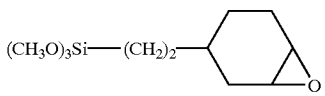

$CH_2=C(CH_3)-COO-C_3H_6-Si(OCH_3)_3$, $CH_2=CH-COO-C_3H_6-Si(OC_2H_5)_3$,
3-cyanopropyltrimethoxysilane,
3-cyanopropyltriethoxysilane,
3-isocyanatopropyltriethoxysilane,
ureidopropyltrimethoxysilane,
3-thiocyanatopropyltrimethoxysilane,
3 mercaptopropyltrimethoxysilane,
3-mercaptopropyltriethoxysilane,
3-mercaptopropylmethyldimethoxysilane,
4-mercaptobutyltrimethoxysilane,
6-mercaptohexyltrimethoxysilane,
3-chloropropyltrimethoxysilane and $(C_2H_5O)_3Si(CH_2)_3-S_4-(CH_2)_3Si(OC_2H_5)_3$.

As trialkoxysilane of the formula:

$$R^2-Si(OR^{**})_2 \quad \quad II$$

suitable compounds are, for example, the following: methyltrimethoxysilane, methyltriethoxysilane, ethyltrimethoxysilane, ethyltriethoxysilane, n-propyltriethoxysilane, n-butyltrimethoxysilane, i-butyltrimethoxysi lane, octyltriethoxysilane, hexadecyltrimethoxysilane, stearyltrimethoxysilane, cyclohexyltrimethoxysilane, cyclohexenylethyltriethoxysilane, phenyltrimethoxysilane, phenyltriethoxysilane, vinyltrimethoxysilane, vinyltriethoxysilane, vinyl-tris(2-methoxyethoxy)silane, allyltrimethoxysilane, allyltriethoxysilane, $CF_3CH_2CH_2Si(OCH_3)_3$, $CF_3CH_2CH_2-Si(OC_2H_5)_3$, $C_2F_5CH_2CH_2-Si(OCH_3)_3$, $C_4F_9CH_2CH_2-Si(OCH_3)_3$, $n-C_6F_{13}CH_2CH_2-Si(OC_2H_5)_3$, $n-C_8F_{17}CH_2CH_2-Si(OCH_3)_3$ and $n-C_{10}F_{21}CH_2CH_2-Si(OCH_3)_3$.

Suitable dialkoxysilanes of the formula:

$$R^3R^4Si(OR^{***})_2 \quad \quad III$$

are, for example, dimethyldimethoxysilane, dimethyldiethoxysilane, diethyldimethoxysilane, methyl-i-butyldiethoxysilane, cyclohexylmethyldimethoxysilane, diphenyldimethoxysilane, diphenyldiethoxysilane, methylphenyldimethoxysilane and $CF_3CH_2CH_2Si(CH_3)(OCH_3)_2$.

As tetraalkoxysilane of the formula:

$$Si(OR^{****})_4 \quad \quad IV$$

suitable compounds are, for example, the following: tetramethoxysilane, tetraethoxysilane, tetra(n-propoxy)silane, tetra(i-propoxy)silane and tetra(n-butoxy)silane.

In the mixture of the silanes I to IV, it is preferred that an average of at least 2.4 alkoxy groups OR*, OR, OR* and OR****, particularly preferably at least 2.5 alkoxy groups and very particularly preferably at least 2.6 alkoxy groups, are present per silicon atom. In this way, it can be ensured that the resulting organopolysiloxane-containing compositions are sufficiently water-soluble. However, depending on the substituents A and $R^1$ to $R^4$, sufficiently water-soluble systems can also be obtained below the preferred minimum value of 2.4. Here, those skilled in the art can identify suitable systems, if necessary by means of simple routine trials.

The water-based organopolysiloxane-containing composition can be prepared from the monomers of the formulae I to IV by mixing the silane composition with water and allowing the mixture to stand at room temperature for at least 3 hours. Here, at least 0.5 mol and preferably at least 1 mol of water should be used per mol of alkoxysilanes used. It is also possible for the entire amount of water present in the ready-to-use cold end coating composition to be added at the beginning. During the maturation time, precondensation to form oligomeric structures takes place. Here, the other components can readily be added right at the beginning.

In a preferred embodiment, the mixture of the silane composition with water (and any other components used) is allowed to stand for at least 4 hours and particularly preferably for at least 6 hours at room temperature (about 20° C.).

At higher or lower temperatures, the maturation time may be adjusted correspondingly. Here, use can be made of the rule of thumb that a temperature increase of 10° C. results in an approximate doubling of the reaction rate.

The water-based organopolysiloxane-containing composition can, however, also be prepared by admixing the silane composition comprising compounds of the formulae I to IV with from 0.5 to 30 mol of water per mol of alkoxysilanes used and removing the alcohol formed in the reaction by distillation. Suitable methods and also some of the oligomeric structures formed in the reaction are disclosed in DE-A 44 43 824 and DE-A 44 43 825, which are hereby expressly incorporated by reference.

The resulting composition can be homogeneous or colloidal. An emulsion can also be used according to the invention, as long as it is stable. The only basic prerequisite which should be met is that no precipitation occurs over the time of use.

The alkoxysilanes of the formulae II to IV and the functional alkoxysilanes of the formula I are preferably employed in a ratio $0 \leq M/Q \leq 12$, more preferably in a ratio $0.02 \leq M/Q \leq 7$ and even more particularly preferably in a ratio $0.1 \leq M/Q \leq 4$.

The component II may act as a synergist for achieving particularly high strength values.

In addition, it has been found that the mixture of the components I and II gives significantly better fixing of the colorant (component IV) than either of the components I or II alone.

Component II comprises the mixture of a polyol and a crosslinker. The basics of this technology are described in L. Dulog, Angew. Makromol. Chem. 123/124 (1984), 437–455.

The mean molecular weight (number average $M_n$) of the water-soluble or water-soluble polyols is from 100 to 200,000, preferably from 500 to 50,000. To improve their water solubility or dispersibility, the polyols used bear covalently bound hydrophilic groups such as polyethylene glycol units (U.S. Pat. No. 3,920,598; EP-A-0 309 114) or neutralized carboxyl or sulfonic acid groups or combinations thereof. If desired, supporting non-covalently bound, external emulsifiers can be used in addition.

Suitable polyols are polyether diols such as polyethylene glycol, polypropylene glycol, polytetramethylene glycol or copolymers of various diols. The molecular weights ($M_n$) are generally in the range from about 200 to about 8000.

Also suitable are water-soluble or water-dispersible hydroxy-functional polyacrylates and polymethacrylates which are neutralized. Such binder components are known from, for example, DE-A 38 32 826, EP-A-0 218 906, EP-A-0 256 540 or EP-A-0 363 723. The hydroxyl numbers of these are usually in the range from 30 to 250, preferably from 50 to 200, and the acid numbers are usually in the range from 20 to 100, preferably from 25 to 40.

Water-soluble or water-dispersible carboxyl- and hydroxyl-containing, neutralized saturated polyesters which have hydroxyl numbers of from 20 to 250, preferably from 50 to 200, and acid numbers of from 20 to 100, preferably from 25 to 60, are also useful as polyols. Such resins are described, for example, in "Lackharze" (editors: Stoye, Freitag), pp. 45–60. Carl Hanser Verlag, Munich, Vienna, 1996, in EP-A-O 061 678 or in U.S. Pat. No. 5,580,340.

Further suitable polyols are water-soluble or water-dispersible urethane-modified carboxyl- and hydroxyl-containing polyols based on polyester, polyether or polycarbonate precursors. The hydroxyl numbers here are usually in the range from 30 to 350, preferably from 50 to 200, and the acid numbers are in the range from 10 to 100, preferably from 20 to 60. Examples of suitable systems are described, inter alia, in DE-A 44 45 199, DE-A 41 01 697, EP-A-0 496 205, EP-A-0 436 941, EP-A-0 355 682, EP-A-0 427 028 and EP-A-0 566 953.

Water-soluble or water-diluable epoxy or alkyd resins are also suitable in principle, but are less preferred because of their tendency to yellowing. Such resins are described in L. Dulog, Angew. Makromol. Chem. 123/124 (1984), 437–455 and in "Lackharze" (editors: Stoye, Freitag), Carl Hanser Verlag, Munich 1996, pp. 45–81 and p. 270 ff.

The generally acid-modified polyols are converted into a hydrophilic form by neutralization. Neutralizing agents which can be used are inorganic bases such as ammonia or organic bases. Suitable organic bases are, for example, primary, secondary or tertiary amines such as ethylamine, n-propylamine, dimethylamine, di-n-butylamine, cyclohexylamine, benzylamine, morpholine, piperidine, triethanolamine, N,N-dimethylethanolamine, N,N-diethylethanolamine, triethylamine, tri-n-propylamine and tri-n-butylamine.

The polyols, which can be used either alone or as a mixture of various types, are preferably in the form of an aqueous solution or a dispersion having a mean particle size of less than 0.1 µm. However, it is also possible to use coarser dispersions provided that they are sufficiently stable on storage and give a sufficiently thin, smooth layer on application together with the other components.

Suitable crosslinkers for the polyols are, for example, amino resins or blocked polyisocyanates.

Amino resins are preferably condensation products of formaldehyde and melamine, urea, guanamine or benzoguanamine, whose methylol groups can be partially or completely etherified with alcohols. This class of crosslinkers is described, for example, in "Lackharze" (editors: Stoye, Freitag), Carl Hanser Verlag, Munich, Vienna, 1996, pp. 104–126. The at least partially etherified types which are preferably used have a frequently satisfactory storage stability, water-solubility and reactivity.

In general, the polyols are used with the amino resins in a mass ratio of the solid resins of from 90:10 to 60:40. This range includes all specific values and subranges therebetween, such as 80:25, 75:25, 70:30 and 65:35.

However, blocked polyisocyanates or mixtures of blocked polyisocyanates with amino resins are preferably used as crosslinkers.

For the purposes of the present invention, polyisocyanates are all compounds which have at least two isocyanate groups in the molecule. The polyisocyanates can be aliphatic, cycloaliphatic, araliphatic, aromatic or heterocyclic. Such polyisocyanates are known in principle from W. Siefken, Liebigs Annalen der Chemie, 562, pages 75 to 136.

Preferred polyisocyanates are, due to the high light resistance and yellowing resistance of the coatings produced therewith, aliphatic and/or cycloaliphatic polyisocyanates having a mean molecular weight of up to about 1000 g/mol, advantageously of up to about 800 g/mol, and a mean isocyanate functionality of from 2 to 4. These include, for example, simple diisocyanates such as 1,6-diisocyanatohexane (HDI), bis(4-isocyanatocyclohexyl) methane (HMDI), 1,5-diisocyanato-2-methylpentane (MPDI), 1,6-diisocyanato-2,4,4-trimethylhexane and/or 1,6-diisocyanato-2,2,4-trimethylhexane (TMDI) and also 4-isocyanatomethyl-3,5,5-trimethylcyclohexylisocyanate (isophorone diisocyanate; IPDI). Further examples are dimers having a uretdione structure prepared by catalytic reaction of these simple diisocyanates, especially IPDI, HDI and/or HMDI.

Another preferred class of polyisocyanates consists of the compounds prepared by allophanatization, trimerization, biuretization or urethanization of the simple diisocyanates and having more than two isocyanate groups per molecule, for example the reaction products of these simple diisocyanates, e.g. IPDI, HDI and/or HMDI, with polyhydric alcohols (e.g. glycerol, trimethylolpropane, penteerythritol) or with prepolymerized polyols based on polyester or polyethers, or else with polyfunctional polyamines, or polyisocyanates based on isocyanurates, for example the triisocyanurates, which are obtainable by trimerization of the simple diisocyanates such as IPDI, HDI and HMDI. Representatives of the (less preferred owing to their tendency to yellowing) aromatic polyisocyanates are, for example, 2,4- and/or 2,6-diisocyanatotoluene and also 4,4'- and/or 2,4'-diisocyanatodiphenylmethane.

The isocyanate groups of the polyisocyanates used are blocked by reaction with suitable blocking agents. Examples of blocking are described, for example, in Z. W. Wicks, Jr., Progress in Organic Coatings 3 (1975), pages 73 to 99 and in Z. W. Wicks, Jr., Progress in Organic Coatings 9 (1981), pages 3 to 28. Use is made of the known blocking agents which undergo an addition reaction with isocyanate groups at from 20 to 120° C.; this addition reaction is reversible at higher temperatures so that the isocyanate groups which are then set free again can react with reactive groups of a polyol. Suitable blocking agents are, for example, secondary or tertiary alcohols, phenols, C-H-acid compounds (such as malonic acid derivatives), lactams (e.g. $\epsilon$-caprolactam) and oximes. Preferred blocking agents are oximes such as formaldoxime, acetaldoxime, cyclohexanone oxime, acetophenone oxime, benzophenone oxime and, in particular, methyl ethyl ketoxime. Further blocking agents which can be used are 3,5-dimethylpyrazole and 1,2,4-triazole.

Apart from these blocked polyisocyanates, it is also possible to use hydrophilically modified blocked polyisocyanates which contain ionic groups or built-in polyalkylene oxide units. Such compounds are described, for example, in EP-A-0 537 578, DE-A-24 56 469, DE-A 32 34 590, EP-A-0 839 847, U.S. Pat. No. 4,098,933, 4,284,544, 5,508,370 and in the literature cited therein.

The mean functionality of the blocked polyisocyanates to be used according to the invention is generally from 2.1 to 6, preferably from 2.4 to 5. The blocked NCO content is generally from 3 to 18% by weight, preferably from 6 to 16% by weight. The acid number of the blocked polyisocyanate resin is from 0 to 60 mg of KOH/g of solid resin, preferably from 0 to 40 mg of KOH/g.

When using water-based blocked polyisocyanates as sole crosslinker, the preparation of the water-based component II used according to the invention is preferably carried out using combinations of the polyols described with blocked polyisocyanates in a stoichiometric ratio of OH to NCO of from 1:0 to 1:2.

If a mixture of amino resin and blocked polyisocyanate is used as crosslinker in component II, a smaller amount of the polyisocyanate hardener is required, preferably in a stoichiometric ratio of the hydroxyl groups of the polyol to latent NCO content of from 1:0.1 to 1:1.5, more preferably from 1:0.2 to 1:1.3; in general, a resin ratio of polyol to amino plastic of from 70:30 to 95:5, preferably from 75:25 to 90:10, may be used.

As a result of the synthesis of the resin, but also for use reasons, amounts of cosolvent may be present in the cold end coating composition. However, these should be less than 10% by weight of the cold end coating composition and preferably less than 5% by weight.

The subsequent crosslinking step is preferably carried out a temperature of from 150 to 270° C. and particularly preferably at a temperature of from 170 to 230° C. These temperature ranges include all specific values and subranges therebetween, such as 160, 175, 180, 190, 200, 210, 220, 240, 250 and 260° C. The usual residence times at this temperature are from about 0.1 second to about 2 hours and most commonly from about 2 to 15 minutes. The necessary heat is introduced, for example, by means of hot air, IR radiation, UV radiation or microwave radiation. However, it is also possible to utilize the intrinsic heat of the substrate which results either from preheating or directly from the production process.

The component III used in one embodiment of this process can be a wax, a partial fatty acid ester, a fatty acid and/or a surfactant.

The wax used as component III is generally used as an aqueous dispersion. In general, any wax which is dispersible in water can be used in the present invention.

Natural waxes and synthetic waxes are equally suitable. As natural waxes, it is possible to use both recent waxes such as beeswax, carnauba wax or candelilla wax and fossil waxes such as montan wax or derivatives thereof or petroleum waxes (both paraffin waxes and microwaxes).

Suitable synthetic waxes are, for example, Fischer-Tropsch waxes, polyolefin waxes such as polyethylene wax, polypropylene wax, polyisobutylene wax, also ester wax (e.g. stearic acid esters of ethylene glycol, diethylene glycol, polyethylene glycol or 1,4-butanediol or glyceryl tristearate), amide waxes (e.g. N,N'-distearoylethylenediamine), polyethylene glycol wax and polypropylene glycol wax.

Non-polar waxes such as petroleum waxes, Fischer-Tropsch waxes and polyolefin waxes can, in the interests of better dispersibility, be used in oxidized form. Such oxidized waxes have been known for a long time.

Of course, it is also possible to use mixtures of various waxes.

More detailed information may be found in Ullmann's Encyclopedia of Industrial Chemistry, Vol. A 28, pp. 103–163. VCH Verlagsgesellschaft, Weinheim, 1996.

For the purposes of the invention, preference is given to using a polyethylene wax (hereinafter referred to as "polyethylene"). The polyethylene used generally has a number average molecular weight $M_n$ in the range from 400 to 20,000. Preference is given to using a polyethylene having an $M_n$ in the range from 500 to 15,000 and particularly preferably an $M_n$ in the range from 1000 to 8000. The polyethylene can be prepared by thermal and, if appropriate, free-radical degradation of a higher molecular weight polyethylene or else by polymerization of ethylene, either by a free radical mechanism or by means of a transition metal catalyst.

The polyethylene can have a certain degree of branching which can also result, in the case of short chain branching, from the use of olefinic comonomers such as propene, 1-butene or 1-hexene.

To produce a dispersion which is suitable for cold end coating, it is customary to use, as starting material, partially oxidized polyethylene which may, if desired, have been additionally esterified and/or saponified. Many types of such polyethylene are commercially available.

In addition, it is possible to use copolymers which comprise more than 50 mol % of ethylene and less than 50 mol % of a polar monomer, for example ethylene-vinyl acetate copolymer waxes or copolymers of ethylene and acrylic acid.

Another possible way of preparing dispersible polyethylene is to graft polyethylene in the melt with an unsaturated polar monomer, for example with maleic anhydride. For this purpose, it is generally useful to add a free-radical initiator.

The polyethylene which has been modified in this way can, if desired after further modification, be converted by customary methods into a nonionic, anionic or cationic dispersion, usually with addition of surfactants as emulsifiers.

The partial fatty acid ester used as component III can be of any type which is customarily used for cold end coating. Examples which may be mentioned are glyceryl monoacetate, glyceryl monostearate, glyceryl distearate and also mixed partial esters of mannitol with stearic acid and palmitic acid.

Fatty acids suitable for use as component III have the structure R—COOH, where R is a radical having from 10 to 22 carbon atoms and may be linear or branched, saturated or unsaturated. Examples which may be mentioned are oleic acid, stearic acid, palmitic acid and lauric acid.

Surfactants which are suitable as component III may be anionic, cationic or nonionic. Anionic surfactants used are, for example, alkali metal salts or ammonium salts of fatty acids which contain at least about 10 carbon atoms and may be saturated or unsaturated. Particularly suitable ammonium salts are morpholinium salts and also monoethanolammonium, diethanolammonium or triethanolammonium salts. Owing to its acceptability for food contact, its biodegradability and its good use properties, particular preference is given to using potassium oleate. Other suitable anionic surfactants are, for example, alkali metal salts of the sulfate esters of $C_8$–$C_{10}$-fatty alcohols or alkali metal salts of sulfonic acids of aliphatic $C_{12}$–$C_{20}$-hydrocarbons.

Cationic surfactants which can be used are, for example, compounds of the type $(RNH_3)^+CH_3COO^-$ or $(RNH_3)^+Cl^-$, where R is a hydrocarbon radical having from 8 to 20 carbon atoms. Other suitable ammonium salts are, for example, acetates or chlorides of $[RN(CH_3)_3]^+$ or $[R^2N(CH_3)_2]^+$, where R is likewise a $C_5C_{20}$-alkyl or aralkyl radical.

Examples of nonionic surfactants are polyoxyethyleneglycerol esters of fatty acids, alkylphenol ethoxylates having from 5 to 30, in particular from 6 to 12, ethylene oxide groups, for example octylphenoxy-polyethoxyethanol, esterification products of fatty acids containing from 7 to 22 carbon atoms with polyethylene glycol, e.g. of stearic acid or oleic acid with PEG40, adducts of ethylene oxide and $C_8$–$C_{20}$-alcohols or adducts of ethylene oxide and $C_8$–$C_{20}$-alkylamines.

In principle, it is also possible other surfactants. Restrictions exist only in so far as the surfactant should be as physiologically acceptable as possible and have some degree of biodegradability.

Of course, the component III can also be a mixture of various substances, for instance of wax and surfactant, wax, fatty acid and surfactant, a partial fatty acid ester and fatty acid or any other combination.

As component IV, it is in principle possible to use all known organic pigments, inorganic pigments and organic dyes. Inorganic pigments which can be used include metallic effect pigments or pearl sheen pigments. Suitable pigments and dyes are described in Ullmann's Encyclopedia of Industrial Chemistry, 5th Edition, Vol. A20, pp. 243–413, VCH Verlagsgesellschaft, Weinheim, 1992 and in Kirk-Othmer, Encyclopedia of Chemical Technology, 3rd Edition, Vol. 8, pp. 159–392, John Wiley & Sons, New York 1979.

The cold end coating composition used according to the invention preferably comprises the individual components in the following concentrations:

| | |
|---|---|
| Component I: | from 0.05 to 20% by weight, particularly preferably from 0.1 to 10% by weight and in particular from 0.1 to 5% by weight; |
| Component II: (as dry material) | from 0.1 to 5% by weight, particularly preferably from 0.2 to 2% by weight; |
| Component III: (as dry material) | from 0 to 5% by weight, particularly preferably from 0.05 to 2% by weight; |
| Component IV: | from 0 to 10% by weight, particularly preferably from 0.1 to 8% by weight. |

Within the scope of the invention, it is also possible to apply a plurality of layers of, if desired, various cold end coating compositions; the following embodiments may be mentioned by way of example:

1. Layer 1: Components I + II +, optionally, III +, optionally, IV
   Layer 2: Coating composition of known composition, e.g. wax, partial fatty acid ester, fatty acid, surfactant, polyacrylate, epoxy resin
2. Layer 1: Components I + II +, optionally, III +, optionally, IV
   Layer 2: Components I + III
3. Layer 1: Components I + II +, optionally, III +, optionally, IV
   Layer 2: Components I + II + III
4. Layer 1: Components I + II
   Layer 2: Components I + II + III + IV
5. Layer 1: Components I + II
   Layer 2: Components I + II + IV
   Layer 3: Components I + III
6. Layer 1: Components I + II
   Layer 2: Components I + II + IV
   Layer 3: Coating composition of known composition
7. Layer 1: Components I + II
   Layer 2: Components II + III
8. Layer 1: Components I + II
   Layer 2: Components II + III + IV The aqueous composition comprising the components I and II and, if desired, III and IV can be produced either in a ready-to-use concentration or initially as a concentrate which is then diluted with water prior to use.

The layer of the cold end coating composition is applied to the surface of the hollow glass containers in a conventional manner, for example by spraying, dipping or rolling-on. The application of the cold end coating composition is carried out in a temperature range of the glass surfaces from about 30 to 150° C., preferably from about 70 to 110° C. and particularly preferably from 80 to 100° C.

When applying the second and, if used, third layer, a separate crosslinking step can be carried out after the application of each layer comprising a component II. A simpler procedure is to dry the last layer applied, which generally takes from about one to a number of seconds, and then apply the next layer. The crosslinking step is then carried out at the end after application of the last layer.

All hydroxyl numbers and acid numbers are given in mg KOH/g. They are determined in accordance with DIN 53240/ASTM E222 and DIN 53402, respectively.

EXAMPLES

Having generally described this invention, a further understanding can be obtained by reference to certain specific examples which are provided herein for purposes of illustration only and are not intended to be limiting unless otherwise specified.

Example 1

This example illustrates the treatment of hot-end-coated ($TiCl_4$) 0.5 liter new beer bottles with a mixture of the components I, II and III.

a) Component 1: 0.5 parts by weight of 3-aminopropyltriethoxysilane b) Component II: 2 parts by weight of VESTICOAT® EP-DS 2779, a cosolvent-free dispersion based on a carboxyl- and hydroxyl containing acrylate resin and a nonhydrophilic, MEK oxime-blocked IPDI trimer; solids content: about 30% by weight (Degussa-Huels AG, D-45764 Marl)

c) Component III: 2.0 parts by weight of a polyethylene dispersion of the trade name TECOL OG 25 from Trüb Chemie, Ramsen, Switzerland (solids content: 25% by weight, anionic emulsifier system)

To produce the cold end coating composition, 95.5 parts by weight of water were placed in a vessel and the components I, II and III were mixed in succession.

The application of the coating composition was carried out at about 80° C. by means of a modified spraying process. After coating, all treated bottles were heated at 200° C. for 15 minutes in a drying oven and were subsequently cooled to room temperature. In all trials, the internal pressure resistances of bottles of one mold number were determined at the exit from the annealing lehr (after heat treatment), after 5, 10, 30 and after 60 minutes in a line simulator (wet) and compared with the internal pressure resistances of the bottles coated in accordance with the prior art. Table I shows the internal pressure resistances found, Table 2 shows the impact strength and scratch resistances found.

For comparison, a standard cold end coating treatment according to the prior art was carried out using a mixture of 2.0 parts by weight of TECOL OG 25 and 98.0 parts by weight of water.

TABLE 1

| | HC/CC | HC/ICC |
|---|---|---|
| Annealing lehr | | |
| Mean [bar] | 45.20 | 51.88 |
| Standard deviation [bar] | 8.28 | 5.82 |
| 5 minutes in line simulator | HC/CC | HC/ICC |
| Mean [bar] | 22.03 | 41.20 |
| Standard deviation [bar] | 2.50 | 8.61 |
| 10 minutes in line simulator | HC/CC | HC/ICC |

TABLE 1-continued

| | | |
|---|---|---|
| Mean [bar] | 20.71 | 40.75 |
| Standard deviation [bar] | 1.73 | 9.69 |
| 30 minutes in line simulator | HC/CC | HC/ICC |
| Mean [bar] | 20.96 | 35.72 |
| Standard deviation [bar] | 1.46 | 3.90 |
| 60 minutes in line simulator | HC/CC | HC/CC |
| Mean [bar] | 20.59 | 32.97 |
| Standard deviation [bar] | 1.23 | 4.49 |

HC: hot end coating
CC: cold end coating in accordance with the prior art
ICC: cold end coating according to the invention

TABLE 2

| | | |
|---|---|---|
| Impact strength | HC/CC | HC/ICC |
| Mean [ips] | 110.75 | 115.75 |
| Standard deviation [ips] | 11.15 | 10.55 |
| Scratch resistance, wet | HC/CC | HC/ICC |
| Mean [ibs] | 67.00 | >70.00*) |
| Standard deviation [ibs] | 2.50 | 0.00*) |

HC: hot end coating
CC: cold end coating with known composition
ICC: cold end coating according to the invention
*) instrument allows a maximum loading of only 70 lbs

Example 2

This example illustrates the treatment of a 0.75 liter wine bottle both with and without hot end coating ($TiCl_4$) with a mixture of the components I and II.

a) Component 1:
  1.5 parts by weight of a silane hydrolysate which was prepared in the following way:
  1580 g of water (87.8 mol) are placed in a heatable stirred reactor (internal thermometer, metering facility via immersed tube, distillation attachment, connection to vacuum pump) and 540 g of 3-aminopropyltriethoxysilane (2.4 mol) are slowly metered in so that the temperature does not exceed 50° C. This reaction is slightly exothermic. The mixture is then thermostated to 50° C. and stirred for another 6 hours. After this time, the silane has been completely hydrolysed to the corresponding silanol and dissolved in the $EtOH/H_2O$ mixture formed. The hydrolysis alcohol is then distilled off at a pressure of 100–70 mbar and a bottom temperature of max. 50° C. When the temperature at the top is about 48° C. and the top product consists only of $H_2O$, the distillation is stopped and the product is adjusted to a weight of 1980 g by addition of $H_2O$.

b) Component II:
  parts by weight of a commercially available aqueous, cosolvent-containing dispersion based on a carboxyl- and hydroxyl-containing resin and a blocked polyhydrodiphenylmethane 4,4'-diisocyanate having a solids content of about 32% by weight.

To produce the cold end coating composition, 96.5 parts by weight of water were to placed in a vessel and the components I and II were then mixed in succession.

The application of the coating composition was carried out at 102° C. using a modified spraying process; the coating was subsequently cured in a curing zone integrated into the annealing lehr (200° C./8.5 minutes including heating-up). In all trials, the internal pressure resistances of bottles of one mold number were determined at the exit from the annealing lehr and after 3 and 10 minutes in a line simulator (wet) and compared with the internal pressure resistances of the bottles coated in accordance with the prior art. Table 3 shows the internal pressure resistances found together with the associated standard deviations.

For comparison, a standard cold end coating treatment according to the prior art was carried out using a mixture of 1.5 parts by weight of TECOL OG 25 and 98.5 parts by weight of water.

TABLE 3

| | | | |
|---|---|---|---|
| Annealing lehr | HC/CC | HC/ICC | ICC |
| Mean [bar] | 26.11 | 27.02 | 26.85 |
| Standard deviation [bar] | 4.08 | 3.77 | 4.32 |
| 3 min in line simulator | HC/CC | HC/ICC | ICC |
| Mean [bar] | 13.47 | 26.61 | 23.74 |
| Standard deviation [bar] | 1.18 | 4.10 | 5.96 |
| 10 min in line simulator | HC/CC | HC/ICC | ICC |
| Mean [bar] | 12.72 | 21.13 | 17.88 |
| Standard deviation [bar] | 0.85 | 4.36 | 4.58 |

HC: hot end coating
CC: cold end coating in accordance with the prior art
ICC: cold end coating according to the invention

Example 3

This example illustrates the industrial-scale coating of 1.0 liter soft drink bottles in a production plant and compares the invention with the prior art, as disclosed in WO-A-98/45216.

a) Coating composition according to the invention:
  0.5 part by weight of 3-aminopropyltriethoxysilane, 1.5 parts by weight of a polyethylene dispersion (TECOL OG 25 from Trüb Chemie, Ramsen, Switzerland) and 2.0 parts by weight of the same dispersion of resin and blocked diisocyanate as in Example 2 are added in succession to 96 parts by weight of water.

b) Coating composition according to the prior art:
  1.5 parts by weight of the polyethylene dispersion are admixed with 98 parts by weight of water. Subsequently, 0.5 part by weight of 3-aminopropyltriethoxysilane is mixed in, after which the mixture is allowed to stand for 6 hours at room temperature. The mixture is then ready to use.

The application of the coating composition was in both cases carried out at 103° C. by means of a spray bridge; subsequently, the bottles coated according to the invention were cured in a curing tunnel (200° C./6.25 minutes including heating-up). For the subsequent tests, 120 bottles of the same mold number were then taken. The test bottles were then tested to determine their internal pressure resistance (zero, 3 minutes and 10 minutes in a line simulator) by means of a ramp pressure tester and also their pendulum impact strength. The results are shown in Table 4.

The same tests were, for comparison, carried out on 120 bottles of the same mold number as above which had been coated with the coating composition corresponding to WO-A-98/45216 which had been prepared as described in b). The results are likewise shown in Table 4.

TABLE 4

| | | |
|---|---|---|
| Annealing lehr | HC/CC | HC/ICC |
| Mean [bar] | 32.64 | 33.62 |
| Standard deviation [bar] | 8.12 | 7.17 |
| 3 min in line simulator | HC/CC | HC/ICC |

TABLE 4-continued

| | | |
|---|---|---|
| Mean [bar] | 21.13 | 30.43 |
| Standard deviation [bar] | 3.77 | 5.53 |
| 10 min in line simulator | HC/CC | HC/ICC |
| Mean [bar] | 16.26 | 27.51 |
| Standard deviation [bar] | 1.89 | 5.93 |
| Pendulum impact strength*) | HC/CC | HC/ICC |
| Mean [ips] | 109.50 | 118.0 |
| Standard deviation [ips] | 16.12 | 8.72 |

HC: hot end coating
CC: cold end coating in accordance with WO-A-98/45216
ICC: cold end coating according to the invention All references cited above are incorporated herein by reference unless otherwise indicated.

Obviously, numerous modifications and variations of the present invention are possible in light of the above teachings. It is therefore to be understood that within the scope of the appended claims, the invention may be practiced otherwise than as specifically described herein.

This Application is based on German Patent Application Serial No. 198 39 682.1, filed on Sep. 1, 1998, and incorporated herein by reference in its entirety.

What is claimed is:

1. A process for producing a surface-sealed hollow glass container, comprising the following sequential steps:
    a) preparing a composition comprising the following components (I) and (II):
        (I) a trialkoxysilane, a dialkoxysilane, a tetraalkoxysilane or mixtures thereof, or a hydrolysis or a condensation product thereof, and
        (II) a water-soluble or water-dispersible mixture of a polyol and a crosslinker; followed by the steps of
    b) coating the surface of a hollow glass container with said composition as prepared in step a);
    c) followed by the step of crosslinking the coating of the resulting coated hollow glass container by heating the coated hollow glass container at a temperature of 100 to 350° C.

2. The process of claim 1, wherein the coating is conducted in a region of an exit from an annealing lehr.

3. The process of claim 2, wherein the annealing lehr is located downstream of a machine which produces the hollow glass containers.

4. The process of claim 1, wherein the composition further comprises:
    (III) a silicon-free component selected from the group consisting of (a) a wax, (b) a partial fatty acid ester, (c) a fatty acid, and (d) a surfactant.

5. The process of claim 4, wherein the composition further comprises:
    (IV) a colorant selected from the group consisting of organic pigments, inorganic pigments and organic dyes.

6. The process of claim 1, wherein the composition further comprises:
    (IV) a colorant selected from the group consisting of organic pigments, inorganic pigments and organic dyes.

7. The process of claim 1, wherein I is a water-based organopolysiloxane-containing composition prepared from:
    (a) Q mol of an alkoxysilane bearing functional groups and having the formula $$A-Si(R^1)_y(OR^*)_{3-y} \quad \quad I$$

and (b) M mol of alkoxysilanes selected from the group consisting of
        α) trialkoxysilanes of the formula $$R^2-Si(OR^{**})_3 \quad \quad II$$

and/or
        β) dialkoxysilanes of the formula $$R^3R^4Si(OR^{***})_2 \quad \quad III$$

and/or
        γ) tetralkoxysilanes of the formula $$Si(OR^{****})_4 \quad \quad IV$$

wherein
        A is a substituent which bears at least one amino, alkylamino, dialkylamino, amido, epoxy, acryloxy, methacryloxy, cyano, isocyanato, ureido, thiocyanato, mercapto, sulfane or halogen group bound to silicon either directly or via an aliphatic or aromatic hydrocarbon radical,
        $R^1$=methyl, ethyl or A (as defined above),
        y=0 or 1,
        $R^*$, $R^{}$, $R^{*}$ and $R^{****}$ are each, independently of one another, an alkyl group having from 1 to 8 carbon atoms or a corresponding alkyl group substituted by an alkyl[(poly)ethylene glycol] radical,
        $R^2$, $R^3$ and $R^4$ are each, independently of one another, an alkyl, alkenyl, alkynyl, cycloalkyl, cycloalkenyl or aromatic group having in each case a maximum of 18 carbon atoms or such a group which is partially fluorinated or perfluorinated and/or substituted by alkyloxy and/or aryloxy groups,
    in a molar ratio $0 \leq M/Q \leq 20$.

8. The process of claim 7, wherein an average of at least 2.4 alkoxy groups $OR^*$, $OR^{}$, $OR^{*}$ and $OR^{****}$ are present per silicon atom in the mixture of the silanes I to IV.

9. The process of claim 7, wherein the water-based organopolysiloxane-containing composition is prepared by mixing the silane composition comprising compounds of the formulae I to IV with water and allowing the mixture to stand at room temperature for at least 3 hours.

10. The process of claim 7, wherein the water-based organopolysiloxane-containing composition is prepared by admixing the silane composition comprising compounds of the formulae I to IV with from 0.5 to 30 mol of water per mol of alkoxysilanes used and removing the alcohol formed in the reaction by distillation.

11. The process of claim 1, wherein the crosslinker is an amino resin or a blocked polyisocyanate.

12. The process as of claim 1, further comprising coating the surface of the hollow glass container with a hot end coating.

13. The process of claim 5, wherein the composition comprises:
    from 0.05 to 20% by weight of I;
    from 0.1 to 5% by weight of II;
    from 0 to 5% by weight of III; and
    from 0 to 10% by weight of IV.

14. The process of claim 1, wherein the composition contains up to 10% by weight of organic cosolvents.

15. The process of claim 1, wherein the temperature of the glass surface when the coating composition is applied is 30 to 150° C.

16. The process of claim 15, wherein the temperature of the glass surface is 70 to 110° C.

17. The process of claim 1, wherein the crosslinking is conducted at a temperature of from 150 to 270° C.

18. The process of claim 17, wherein the crosslinking is conducted at a temperature of from 170 to 230° C.

19. A hollow glass container produced by the process of claim 1.

* * * * *